United States Patent
Homa

(10) Patent No.: US 7,752,870 B1
(45) Date of Patent: Jul. 13, 2010

(54) HYDROGEN RESISTANT OPTICAL FIBER FORMATION TECHNIQUE

(75) Inventor: Daniel Scott Homa, Bloomsbury, NJ (US)

(73) Assignee: Baker Hughes Incorporated, Houston, TX (US)

( * ) Notice: Subject to any disclaimer, the term of this patent is extended or adjusted under 35 U.S.C. 154(b) by 1766 days.

(21) Appl. No.: 10/687,454

(22) Filed: Oct. 16, 2003

(51) Int. Cl.
*C03B 37/018* (2006.01)

(52) U.S. Cl. .............................. 65/417; 65/419; 65/424; 65/428

(58) Field of Classification Search .................. 65/397, 65/417, 419, 424, 428
See application file for complete search history.

(56) References Cited

U.S. PATENT DOCUMENTS

| | | | | |
|---|---|---|---|---|
| 4,310,340 A | * | 1/1982 | Sarkar | .......................... 65/418 |
| 4,389,230 A | | 6/1983 | Modone et al. | |
| 4,445,918 A | | 5/1984 | Modone et al. | |
| 4,468,413 A | | 8/1984 | Bachmann | |
| 4,515,612 A | | 5/1985 | Burrus, Jr. et al. | |
| 4,583,997 A | | 4/1986 | Staudigl | |
| 4,627,160 A | * | 12/1986 | Herron et al. | .................. 29/830 |
| 4,691,940 A | | 9/1987 | Stenzel et al. | |
| 5,735,921 A | * | 4/1998 | Araujo et al. | ................. 65/32.1 |
| 5,838,866 A | | 11/1998 | Antos et al. | |
| 6,053,013 A | * | 4/2000 | Oh et al. | ........................ 65/412 |
| 6,116,055 A | | 9/2000 | Ishikawa et al. | |
| 6,128,928 A | | 10/2000 | Antos et al. | |
| 6,131,415 A | | 10/2000 | Chang et al. | |
| 6,438,999 B1 | | 8/2002 | Antos et al. | |
| 6,532,774 B2 | * | 3/2003 | Zhang et al. | ................... 65/390 |
| 2002/0150365 A1 | * | 10/2002 | Antos et al. | .................. 385/123 |
| 2002/0168159 A1 | | 11/2002 | Takahashi et al. | |
| 2002/0194877 A1 | | 12/2002 | Chang et al. | |
| 2002/0197005 A1 | | 12/2002 | Chang et al. | |
| 2002/0197035 A1 | | 12/2002 | Early et al. | |
| 2003/0010064 A1 | | 1/2003 | Kuwahara et al. | |
| 2003/0213268 A1 | * | 11/2003 | Homa | .......................... 65/390 |

FOREIGN PATENT DOCUMENTS

JP 02180729 A * 7/1990

* cited by examiner

*Primary Examiner*—Steven P Griffin
*Assistant Examiner*—Queenie Dehghan

(57) ABSTRACT

A method of forming an optical fiber preform using, for example, an MCVD process, is modified to reduce the presence of hydrogen-induced transmission losses in an optical fiber drawn from the preform. A relatively porous, unsintered soot layer is first formed (similar to the initial soot layer commonly associated with the solution-doped process of the prior art) and then subjected to a flow of a metal halide (such as $SiCl_4$) to reduce the presence of excess oxygen. It is imperative that the metal halide treatment occur in the absence of oxygen. Sintering of the treated layer, followed by a conventional collapsing process is then used to form the inventive preform. In accordance with the present invention, both the sintering and collapsing steps are performed in a non-oxygen based ambient. When the drawn fiber is then later exposed to hydrogen, the lack of oxygen thus eliminates the formation of Si—OH and the associated attenuation problems.

20 Claims, 5 Drawing Sheets

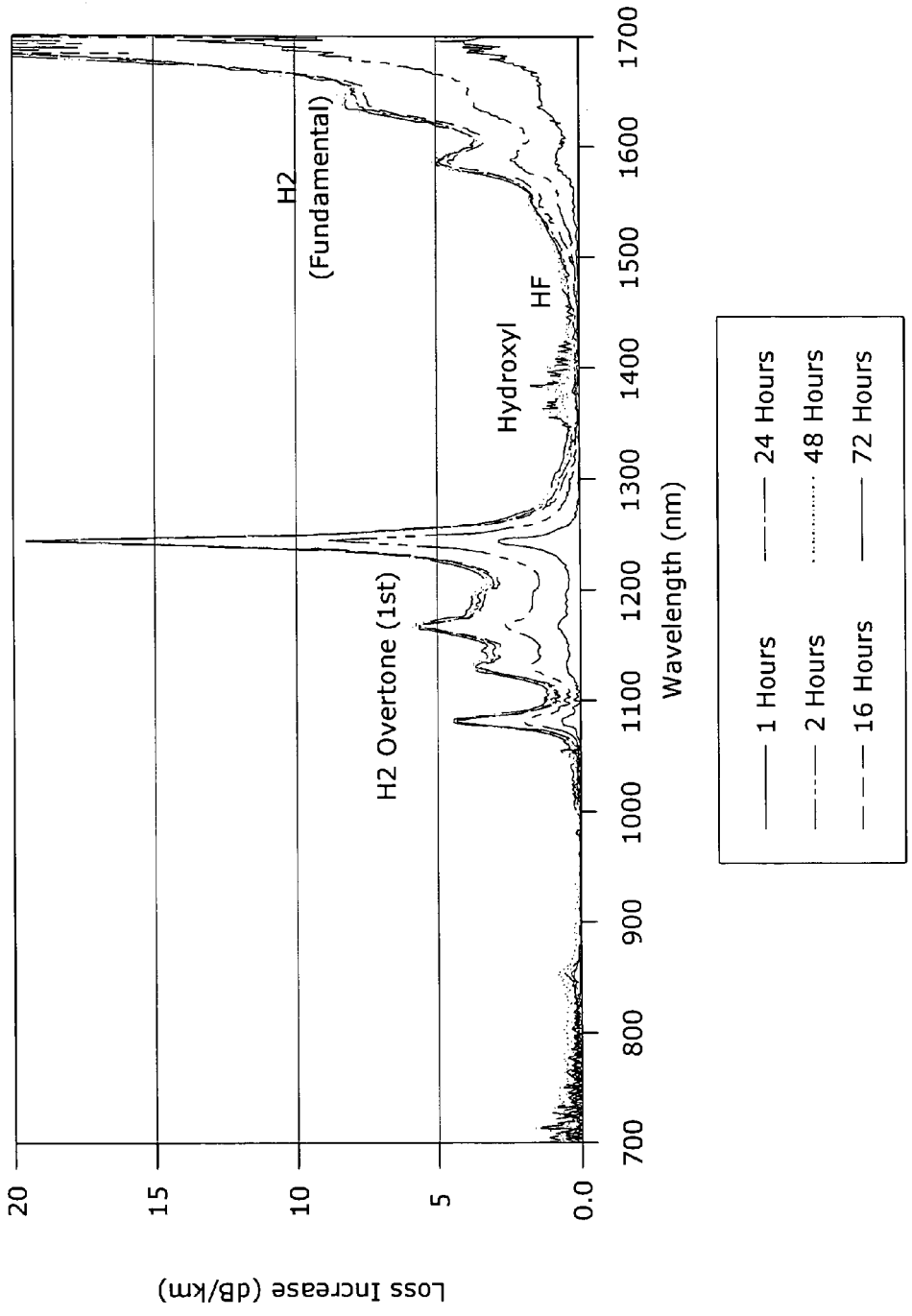
Fig. 6: Demonstration of Hydrogen Induced Attenuation at 100 PSI $H_2$ & 100C.

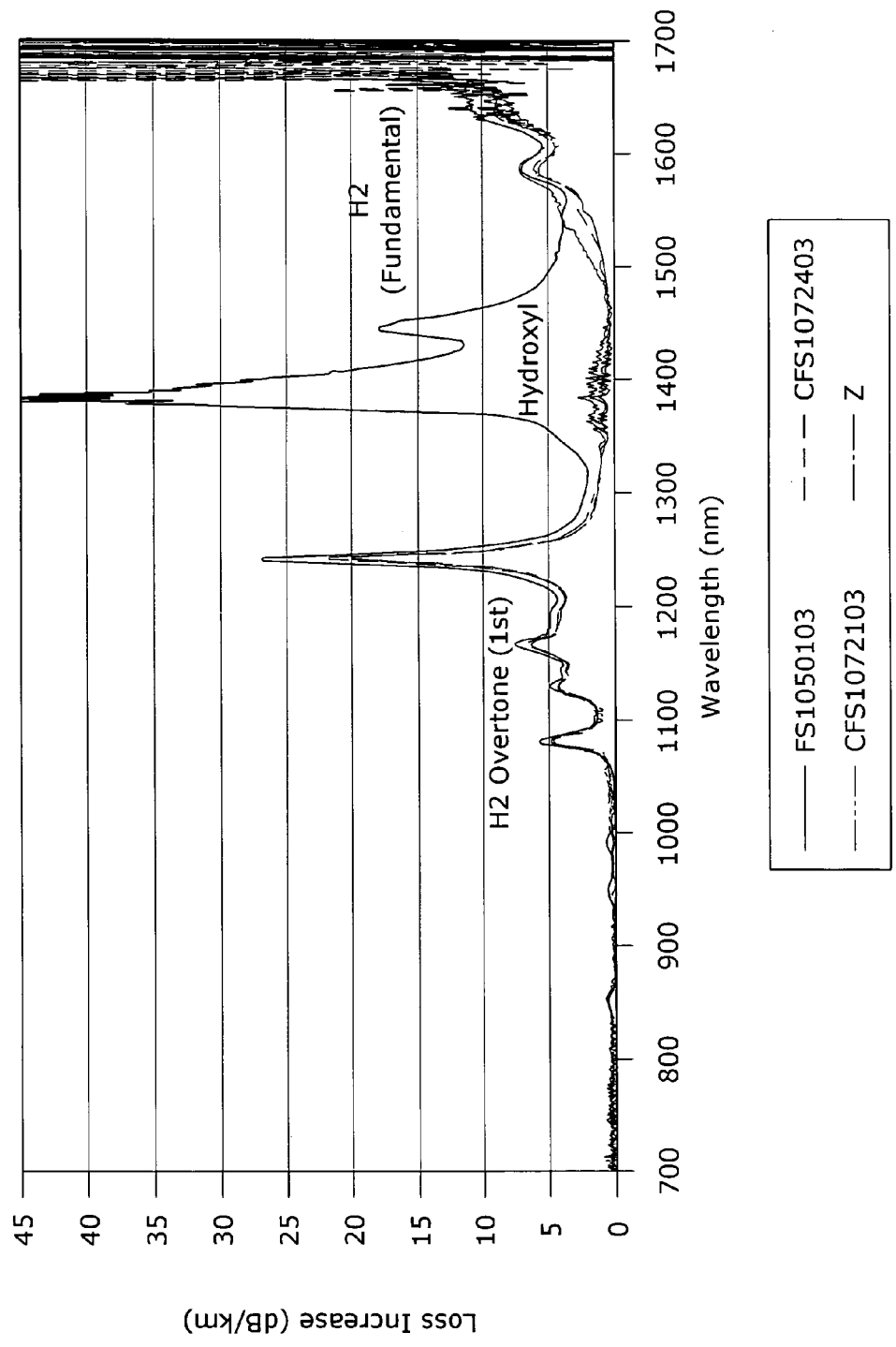
Fig. 7: Elimination of SiOH and HF Absorption Peaks in 100 PSI H2 & 100C.

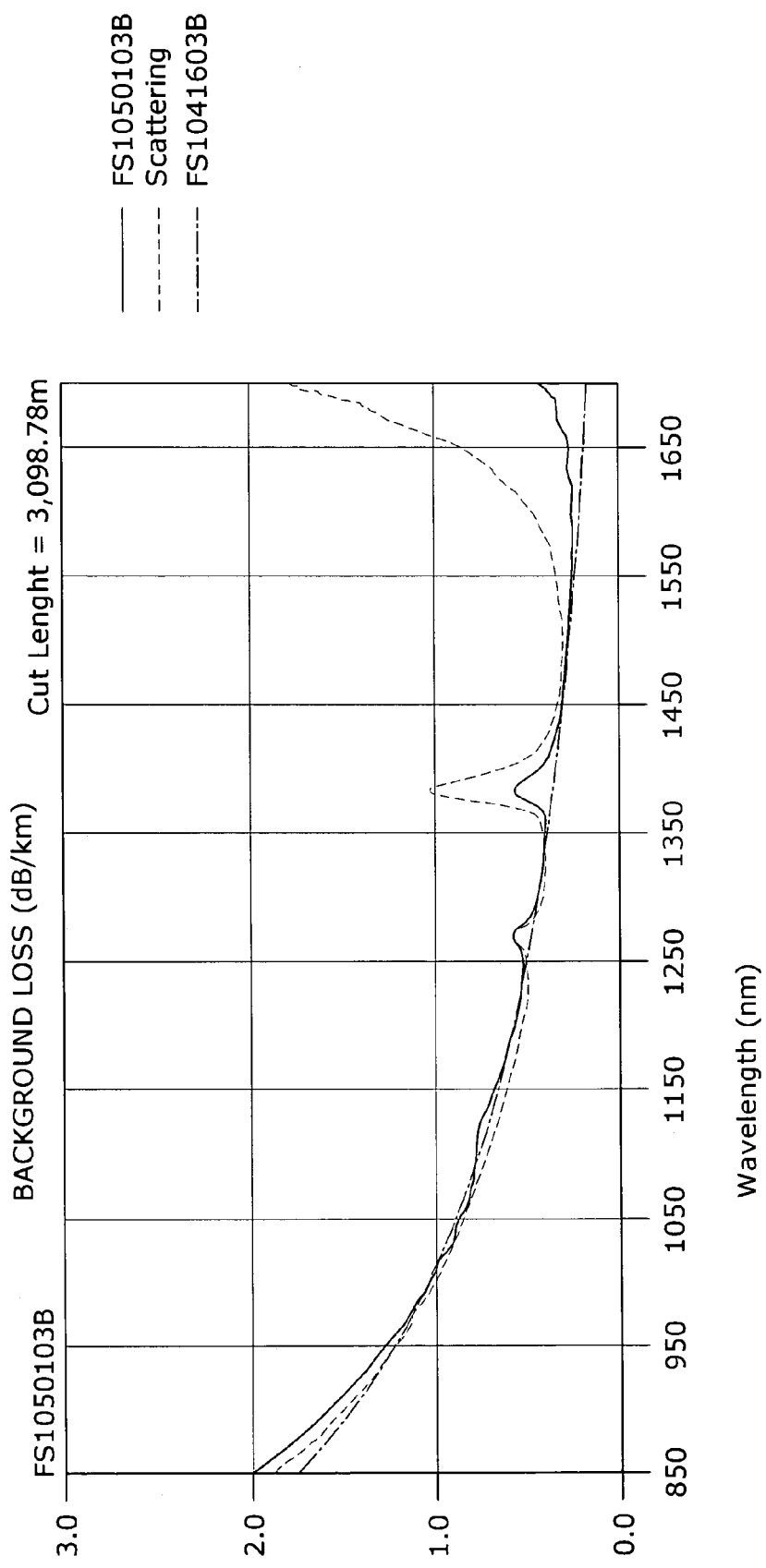
Fig. 8: Attenuation of Pure Silica Core Fiber with Excess Oxygen.

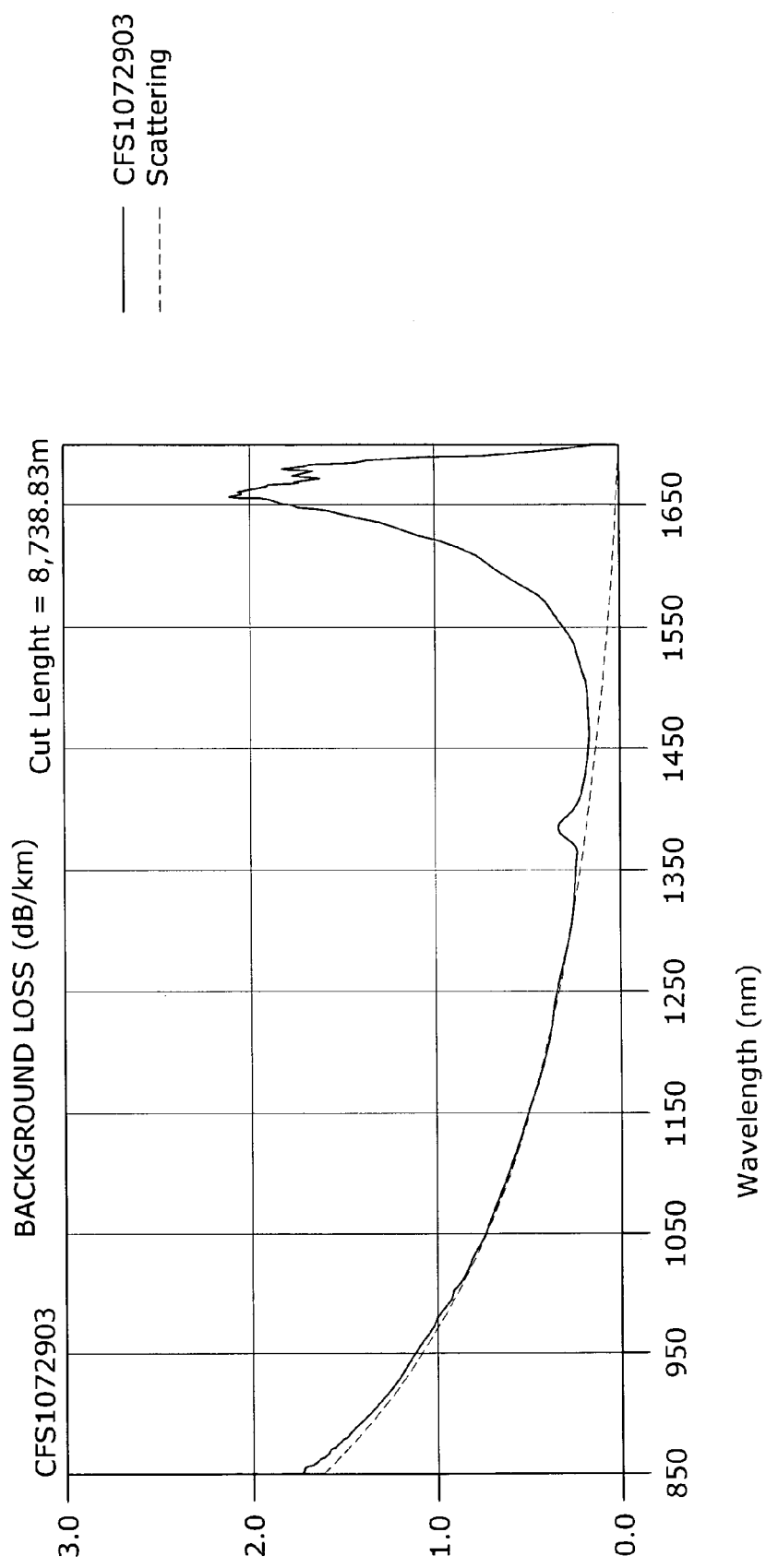

HYDROGEN RESISTANT OPTICAL FIBER FORMATION TECHNIQUE

TECHNICAL FIELD

The present invention relates to a hydrogen resistant optical fiber formation technique and, more particularly, to the initial use of an unsintered soot, subjected to a treatment with a metal halide vapor, to eliminate the formation of Si—OH when exposed to hydrogen at various pressures and temperatures.

BACKGROUND OF THE INVENTION

In the art of fiber preform manufacture for transmission fibers, techniques have been developed for high speed manufacture using a chemical vapor deposition process, which has been found to be relatively inexpensive, while also providing a high quality fiber. In this process, the necessary cladding and core constituents are supplied in their vapor phase to a horizontally rotated refractory tube to form one or more inner glass layers on the inside surfaces of the tube. Exemplary of this technique is U.S. Pat. No. 4,909,816, issued to MacChesney et al., and its companion patents U.S. Pat. Nos. 4,217,027 and 4,334,903, disclosing what is referred to in the art as the "modified chemical vapor deposition" (MCVD) process.

Conventional MCVD processes of forming optical fiber preforms have been found to result in allowing OH⁻ groups to form in the fiber material. In particular, hydrogen occurring in elemental or compound form is often found in the reactants used for making the preform. Subsequent to formation of the fiber, hydrogen may also become incorporated in the composition and thus compromise the transmission qualities of the fiber. A number of strategies have been developed to avoid this hydrogen incorporation, including the use of hermetically sealed fiber cables, or cables exhibiting various layers of outer cladding to prevent hydrogen intrusion.

As an alternative, a hydrogen gettering process may be used, as disclosed in U.S. Pat. No. 5,596,668 issued to DiGiovanni et al. on Jan. 21, 1997. In the DiGiovanni et al. arrangement a species for gettering or bonding with hydrogen (such as a metal) is included in the cladding layer of the fiber. Diffusion of hydrogen into the fiber is thus trapped in the cladding before it can encroach the core region.

U.S. Pat. No. 4,125,388 issued to Powers on Nov. 14, 1978 discloses a method for making a high purity optical waveguide that exhibits a very low water concentration, where the presence of water (like hydrogen) leads to attenuation in various transmission bands of interest. Powers discloses a method of reducing water attenuation by removing water from the soot preform during the step in which a soot preform is heated to fuse the soot particles into a glass. Powers discloses the use of $Cl_2$ gas as a drying agent. The $Cl_2$ may be fed directly to the preform, or a metal halide gas (such as $GeCl_4$ or $SiCl_4$) may be used together with an oxidizing agent to produce $Cl_2$ in the vicinity of the preform. The drying is carried out within a temperature range in which the soot will fuse into a dense glass.

In an alternative process, a continuous admixture of deuterium with a flow of a carrier gas (such as oxygen) during the preform manufacturing process allows for the isotropic substitution of the deuterium for the hydrogen in the hydroxl group. This substitution results in shifting the absorption peaks out of the wavelength range of interest for optical communication purposes.

A disadvantage of these various techniques is the need for an oxidizing agent, since the presence of excess oxygen in the glass makes the fiber more susceptible to hydrogen-induced loss during subsequent cabling or use in the field. Moreover, the number of defects in the fiber is known to be directly proportional to the induced attenuation upon post-processing exposure to hydrogen.

SUMMARY OF THE INVENTION

The needs remaining in the prior art are addressed by the present invention, which relates to a hydrogen resistant optical fiber formation technique and, more particularly, to the initial use of an unsintered soot, subjected to a treatment with a metal halide vapor, to eliminate the formation of Si—OH when the drawn fiber is thereafter exposed to hydrogen at various pressures and temperatures.

In accordance with the present invention, an initial unsintered porous soot is first formed on the inner surface of a preform tube. The unsintered soot can be deposited by a method similar to that used for solution doping of a fiber preform, where an extremely porous, unsintered soot is subsequently used as a "sponge" for absorbing a liquid dopant. In the process of the present invention, the extremely porous unsintered soot is then subjected to a flow of a metal halide (e.g., $SiCl_4$) in an environment of, for example, He and/or $N_2$ for a predetermined period of time. Importantly, no oxygen is present during this flow process. The resulting structure is then sintered in a $SiCl_4/He/N_2$ environment to form the amorphous glass and collapsed to form the final preform structure.

Advantageously, the presence of $SiCl_4$ (without oxygen) has been found to eliminate oxygen-rich defects (Si—O—O—Si) present in the structure as a result of the soot deposition process. The separation of the soot deposition and sintering processes by the $SiCl_4$ "scrubbing" thus significantly reducing hydrogen-induced attenuation in the final structure.

Other and further advantages of the present invention will become apparent during the course of the following discussion and by reference to the accompanying drawings.

BRIEF DESCRIPTION OF THE DRAWINGS

Referring now to the drawings,

FIG. 6 is a graph illustrating the effects of the presence of hydrogen in the transmission spectra of a conventional prior art fiber;

FIG. 7 is a graph of the transmission spectrum of a fiber drawn from a preform formed in accordance with the present invention, illustrating in particular the elimination of the attenuation valleys associated the presence of hydrogen;

FIG. 8 is a prior art graph illustrating transmission attenuation for the wavelength range of 800-1700 nm; and FIG. 9 is a graph illustrating the improvement in transmission for the wavelength range of 800-1700 nm.

DETAILED DESCRIPTION

The motivation for the concepts developed in accordance with the present invention is to improve the resistance of optical fiber to hydrogen-induced loss typically seen in harsh environments, such as the use of fiber optic sensors within an oil well. Such an environment cannot be well-controlled to guarantee that water or other contaminants will not be present. The silicon defects introduced into the optical fiber during a conventional prior art manufacturing process typically result in SiOH and SiH losses in the fiber, due to the reaction over time between the Si defects and hydrogen. It is thought that the oxygen-rich defects are responsible for the formation of Si—OH and the increased loss at 1385 nm. The oxygen-rich defects arise due to excess oxygen atoms present in the silica glass, resulting from preform fabrication in an environment with too much oxygen. Furthermore, the introduction of impurity dopants (for example, germanium) can generate defects that result in creased attenuation in the telecommunications window. As a result, the fiber formed in accordance with the present invention reduces the effects of hydrogen-induced losses by elimination of the Si defects caused by excess oxygen in a pure silica core fiber. FIGS. 1-5 illustrate an exemplary process sequence of forming an optical fiber preform, using a conventional, well-known MCVD technique, that exhibits significant improvement in eliminating hydrogen-induced loss from the optical fiber preform. It is to be understood that various other deposition techniques may be used, such as vapor-assisted deposition (VAD) or outside vapor deposition (OVD), in performing the process of the present invention.

Figure 1:
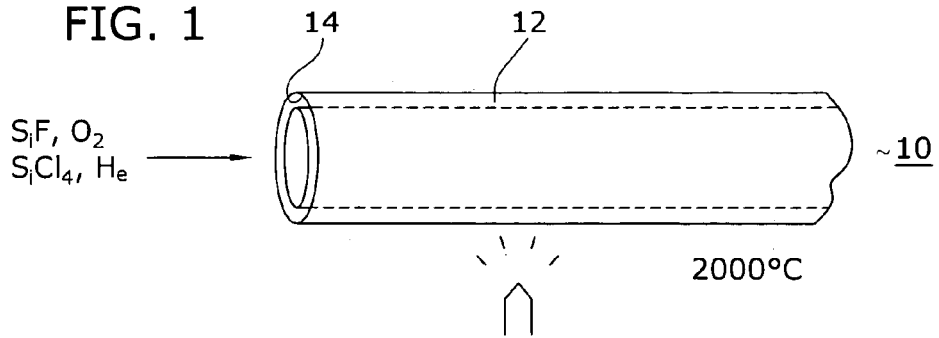
FIG. 1 illustrates an initial step in the fabrication process of the present invention, related to the formation of cladding layers within a preform tube.

Referring now to the drawings, FIG. 1 illustrates an exemplary glass tube 10 used to fabricate an optical fiber preform using the MCVD fabrication technique. In the exemplary step as shown in FIG. 1, a cladding layer (or layers) 12 is formed on inner wall surface 14 of tube 10. In particular, one or more fluorine-doped cladding layers are formed using a conventional MCVD technique from precursors of $SiF$, $O_2$, $SiCl_4$ and He flowing through tube 10, where tube 10 is heated to a temperature of, for example, 2000° C. to cause the deposition of layer 12 along surface 14.

Figure 2:
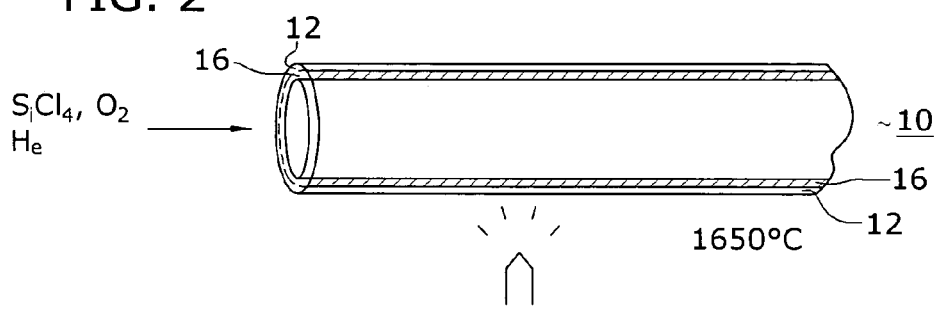
FIG. 2 illustrates a subsequent step in the inventive process showing the deposition of a porous, unsintered soot layer within the preform tube.

Subsequent to the formation of cladding layer 12 (which may, as mentioned above, comprise one or more separate layers), and in accordance with the present invention, a porous, unsintered soot layer 16 is formed so as to completely cover cladding layer 12. The term "soot" is used to define a deposited layer exhibiting a large degree of porosity, where the layer is not sintered to as to form a glass (or amorphous) layer. The soot layer may comprise $SiO_2$ (pure), or $SiO_2$ doped with a material such as Al, Si, P, Cl, Ge, Ga, Ta, Pb, Li. A relatively low temperature process is used to form soot layer 16, where as shown in FIG. 2, a deposition process utilizing $SiCl_4$, $O_2$ and He at a temperature of 1650° C. may be used. In general, a temperature range of 1400-1900° C. has been found satisfactory for the purposes of the present invention. In accordance with the present invention, the presence of a highly porous, unsintered soot layer 16 will allow for any "free" hydrogen to thereafter be bound to a metal halide and thus significantly reduce the effects of hydrogen-induced loss as seen in the prior art. The metal species (for example, $Si^{+2}$ in the case of silicon), bonds with the excess oxygen (peroxyl defect, Si—O—O—Si) to form a more stable O—Si—O structure. Thus, when exposed to hydrogen, the resulting permanent Si—OH bond does not form in the glass. The formation of this bond will then release $Cl_2$ which will form HCl with hydrogen to reduce the OH contamination of the preform glass during processing.

Figure 3:
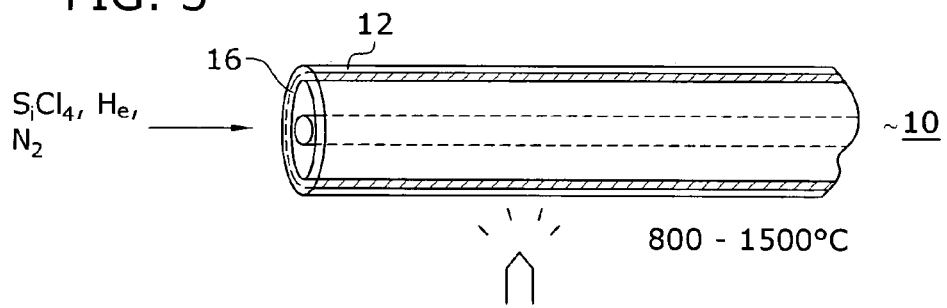
FIG. 3 illustrates the flow of $SiCl_4$ within the tube of FIG. 2 so as to reduce the presence of hydrogen within the structure.

Referring to FIG. 3, the next step in the inventive process is directed to this bonding step by flowing a metal halide (such as, for example, $SiCl_4$, $GeCl_4$, $AlCl_3$, NaCl, LiCl, $MgCl_2$, $CaCl_2$, or any other suitable metal halide) in an ambient of He and $N_2$ through preform 10. For the purpose of discussion only, the metal halide $SiCl_4$ will be presumed. The metal halide treatment of the present invention is considered to be a relatively low temperature process (occurring at a temperature in the range of, for example, 800-1500° C.). If the temperature is too low, the reaction will not occur over a reasonable period of time, while if the temperature is too high, the soot will begin to partially sinter, thus reducing the porosity of the soot and limiting the efficiency of the reaction. In accordance with the present invention, it is extremely important that absolutely no oxygen ambient be present during this step. The treatment of this step may be performed for a time range of a few minutes to ten hours or more (as a function of the reaction temperature) to insure that all of the free hydrogen, excess oxygen defects, and peroxyl linkages have been eliminated from within preform 10. In most cases, a treatment for between two and three hours has been found to be sufficient.

Figure 4:
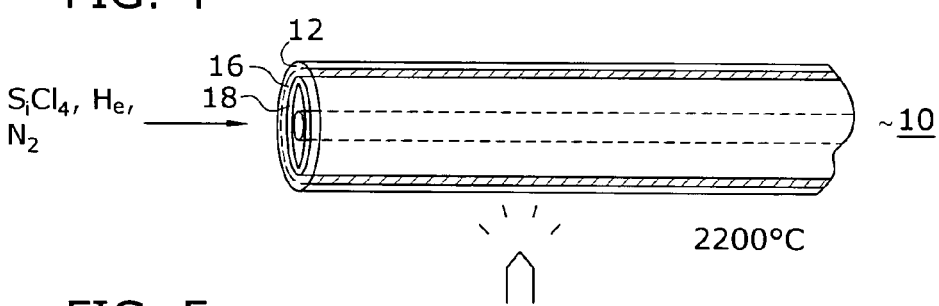
FIG. 4 illustrates the sintering step of the inventive process.
Figure 5:
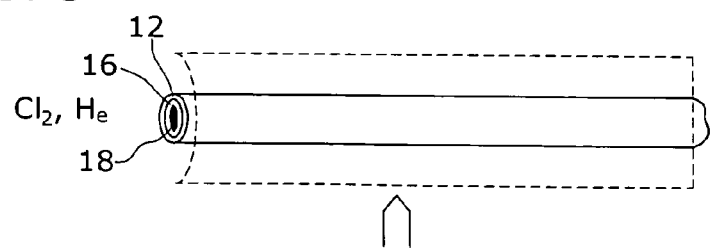
FIG. 5 illustrates the step of collapsing the hollow preform tube to form the solid core preform of the present invention.

Once the presence of hydrogen has been reduced, the arrangement is subjected to a conventional sintering step, as shown in FIG. 4, to form the amorphous glass layer 18 that will ultimately form the core region of the optical preform. The sintering step, again occurring in an $SiCl_4$, He and $N_2$ ambient, requires an elevated temperature, such as 2200° C. As with the prior art processes, the sintered structure is then collapsed to eliminate the central opening and form a solid core preform structure, as shown in FIG. 5. As with the $SiCl_4$ treatment and sintering steps, it is preferred (but not required) that no oxygen be present during the collapsing step. In particular, an ambient of $Cl_2$ and He can be used during the collapsing step of the inventive process.

It has been found that the hydrogen-induced attenuation occurs as a result of two different phenomena: (1) the absorption of molecular hydrogen in the wavelength region of 1000-1300 nm, and (2) the chemical reactions between the silica glass network and hydrogen, particularly evident at the wavelength of 1385 nm. The absorption of the $H_2$ molecule is reversible and cannot be avoided in glass materials. The chemical reaction phenomenon results in permanent attenuation, where the extent of loss is dependent on the chemistry of the glass itself. FIG. 6 illustrates a transmission spectrum for a conventionally formed optical fiber, particularly showing the presence of attenuation at 1385 nm (related to the presence of Si—OH and often referred to as the "water peak" loss), and also at 1440 nm (related to the presence of HF). By comparison, FIG. 7 illustrates the transmission spectrum associated with a fiber drawn from a preform formed in accordance with the present invention. As shown, the attenuation at both 1385 nm and 1440 nm has been virtually eliminated.

Further advantages of the metal halide treated soot also include the reduction of the initial attenuation at 1385 nm, as well as further reduced background loss in the wavelength range extending from 300-1700 nm. As seen in FIGS. 8 and 9, the attenuation at 1270 nm (shown in the prior art diagram of FIG. 8) has been eliminated in the $SiCl_4$ treated soot, as evident by the plot of FIG. 9. Moreover, the loss at 1385 nm has been reduced from approximately >0.60 dB/km to less than 0.40 dB/km. It has also been demonstrated that the attenuation at 1310 nm can be reduced from approximately 0.40 dB/km to 0.27 dB/km. Similarly the background loss at the other wavelengths have been reduced for improved overall optical fiber transmission performance.

As one variation of the method of the present invention, it is envisioned that the $SiCl_4$ treatment step and the sintering step may be combined under conditions where $SiCl_4$ is included in the non-oxygen environment used to perform the sintering.

It is to be understood that while the essence of the present invention has been described in terms of a preferred embodiment, employing a set of preferred temperatures and ambient conditions for each step in the process, various modifications can be made for each step while remaining within the spirit and scope of the present invention in terms of utilizing a porous, unsintered soot layer and non-oxygen based sintering and collapsing process. Indeed, the scope of the present invention is intended to be defined by the claims appended hereto.

What is claimed is:

1. A method of making an optical preform, the method comprising the steps of:
   a) providing an optical preform tube;
   b) depositing a porous, unsintered soot layer within the inner surface of said tube;
   c) exposing the porous, unsintered soot layer to a flow of a metal halide in an oxygen-free ambient for a period of time sufficient to eliminate the presence of excess oxygen defects in said soot layer;
   d) sintering the metal halide-treated soot layer in an oxygen-free ambient to form an amorphous glass layer; and
   e) collapsing said sintered preform tub of step d) to form a solid core optical fiber preform.

2. The method as defined in claim 1 wherein prior to performing step b), one or more cladding layers are deposited on the inner surface of the preform tube provided in step a).

3. The method as defined in claim 2, wherein the one or more cladding layers comprise a depressed-index cladding.

4. The method as defined in claim 3, wherein one or more fluorine-doped cladding layers are deposited.

5. The method as defined in claim 1 wherein in performing step b), the soot is deposited using a low temperature process.

6. The method as defined in claim 5 wherein the soot deposition temperature is in the range of approximately 1400-1900° C.

7. The method as defined in claim 6 wherein the soot deposition temperature is maintained at a value of approximately 1650° C.

8. The method as defined in claim 1 wherein in performing step b), the deposit soot comprises $SiO_2$.

9. The method as defined in claim 8 wherein in performing step b), the deposited $SiO_2$ soot is doped with a material chosen from the group consisting of Al, Si, P, Cl, Ge, Ga, Ta, Pb, and Li.

10. The method as defined in claim 1 wherein in performing step c), the metal halide used is $SiCl_4$.

11. The method as defined in claim 1 wherein in performing step c), the metal halide used is $GeCl_4$.

12. The method as defined in claim 1 wherein in performing step c), the flow is maintained for a time period of at least ten minutes to at most ten hours.

13. The method as defined in claim 1 wherein in performing step c), the metal halide treatment is performed in an ambient of He and $N_2$.

14. The method as defined in claim 1 wherein in performing step c), the metal halide treatment is performed in a temperature range of 800-1500° C.

15. The method as defined in claim 1 wherein in performing step d), the sintering is performed in an ambient of He and/or $N_2$.

16. The method as defined in claim 1 wherein in performing step d), the sintering is performed at a temperature of approximately 2200° C.

17. The method as defined in claim 1 wherein in performing step e), the collapsing occurs in an ambient of $Cl_2$ and/or He.

18. The method as defined in claim 1 wherein in performing step e), the collapsing occurs at a temperature of approximately 2200° C.

19. A method of making an optical preform, the method comprising the steps of:
   a) providing an optical preform tube;
   h) depositing a porous, unsintered soot layer within the inner surface of said preform tube;
   c) sintering the soot layer in an oxygen-free environment of $SiCl_4$, He and $H_2$ to form an amorphous glass layer; and
   d) collapsing said sintered, metal halide-treated preform tube of step c) to form a solid core optical fiber preform.

20. The method as defined in claim 19 wherein prior to performing step b), one or more cladding layers are deposited on the inner surface of the preform tube provided in step a).

* * * * *